(12) United States Patent
Barchasz et al.

(10) Patent No.: US 9,337,508 B2
(45) Date of Patent: May 10, 2016

(54) ELECTROCHEMICAL LITHIUM ACCUMULATOR WITH A BIPOLAR ARCHITECTURE COMPRISING A SPECIFIC ELECTROLYTE ADDITIVE

(75) Inventors: Celine Barchasz, Fontaine (FR);
Marianne Chami, Fontaine (FR);
Sebastien Patoux, Saint Nicolas de Macherin (FR)

(73) Assignee: Commissariat à l'énergie atomique et aux ènergies alternatives, Paris (FR)

( * ) Notice: Subject to any disclaimer, the term of this patent is extended or adjusted under 35 U.S.C. 154(b) by 0 days.

(21) Appl. No.: 13/704,607

(22) PCT Filed: Jun. 15, 2011

(86) PCT No.: PCT/EP2011/059969
§ 371 (c)(1),
(2), (4) Date: Dec. 31, 2012

(87) PCT Pub. No.: WO2011/157765
PCT Pub. Date: Dec. 22, 2011

(65) Prior Publication Data
US 2013/0108913 A1    May 2, 2013

(30) Foreign Application Priority Data
Jun. 17, 2010    (FR) ..................... 10 54817

(51) Int. Cl.
*H01M 10/056*    (2010.01)
*H01M 4/485*    (2010.01)
(Continued)

(52) U.S. Cl.
CPC ............ *H01M 10/056* (2013.01); *H01M 4/485* (2013.01); *H01M 4/505* (2013.01);
(Continued)

(58) Field of Classification Search
CPC .......... H01M 10/0567; H01M 10/052; H01M 10/0525; H01M 10/056; H01M 4/485; H01M 4/505; H01M 4/525
USPC ........................................................ 429/160
See application file for complete search history.

(56) References Cited

U.S. PATENT DOCUMENTS 4,352,867 A * 10/1982 Catanzarite .................. 429/101
5,882,812 A    3/1999 Visco et al.
(Continued)

FOREIGN PATENT DOCUMENTS

WO    2008053365 A2    5/2008

OTHER PUBLICATIONS

Wang et al., "Electrochemical properties of TiP2O7 and LiTi2(PO4)3 as anode material for lithium ion battery with aqueous solution electrolyte", Electrochimica Acta, vol. 52, Issue 9, Feb. 15, 2007, pp. 3280-3285, ISSN 0013-4686.*
(Continued)

*Primary Examiner* — Nicholas P D'Aniello
(74) *Attorney, Agent, or Firm* — Hultquist, PLLC; Mary B. Grant

(57) ABSTRACT

The invention relates to an electrochemical lithium accumulator comprising a stack of at least two electrochemical cells, each cell being separated from its adjacent cell by a current-collecting substrate, a first face of this substrate being occupied by an electrode of a cell while a second substrate face opposite to the first is occupied by an electrode of its adjacent cell, each cell comprising a positive electrode and a negative electrode separated by an electrolyte, characterized in that the electrolyte comprises a lithium polysulfide additive.

16 Claims, 2 Drawing Sheets

(51) Int. Cl.
- *H01M 4/505* (2010.01)
- *H01M 4/525* (2010.01)
- *H01M 4/58* (2010.01)
- *H01M 10/052* (2010.01)
- *H01M 10/0525* (2010.01)
- *H01M 10/0567* (2010.01)

(52) U.S. Cl.
CPC ........... *H01M 4/525* (2013.01); *H01M 4/5825* (2013.01); *H01M 10/052* (2013.01); *H01M 10/0525* (2013.01); *H01M 10/0567* (2013.01); *Y02E 60/122* (2013.01); *Y02T 10/7011* (2013.01)

(56) References Cited

U.S. PATENT DOCUMENTS

| | | | |
|---|---|---|---|
| 2004/0091771 A1* | 5/2004 | Hosaka et al. | 429/185 |
| 2005/0221168 A1 | 10/2005 | Dahn et al. | |
| 2008/0038645 A1 | 2/2008 | Kolosnitsyn et al. | |
| 2009/0117467 A1* | 5/2009 | Zhamu et al. | 429/231.8 |
| 2010/0129724 A1 | 5/2010 | Kolosnitsyn | |

OTHER PUBLICATIONS

Kim et al, "Comparative Study of $LiNi_{0.5}Mn_{1.5}O_{4-\delta}$ and $LiNi_{0.5}Mn_{1.5}O_4$ Cathodes Having Two Crystallographic Structures: $Fd\bar{3}m$ and $P4_332$", Chemistry of Materials 2004 16 (5), 906-914.*

* cited by examiner

ELECTROCHEMICAL LITHIUM ACCUMULATOR WITH A BIPOLAR ARCHITECTURE COMPRISING A SPECIFIC ELECTROLYTE ADDITIVE

CROSS-REFERENCE TO RELATED APPLICATIONS

This application is a U.S. national phase under the provisions of 35 U.S.C. §371 of International Patent Application No. PCT/EP11/59969 filed Jun. 15, 2011, which in turn claims priority of French Patent Application No. 1054817 filed Jun. 17, 2010. The disclosures of such international patent application and French priority patent application are hereby incorporated herein by reference in their respective entireties, for all purposes.

TECHNICAL FIELD

The present invention relates to an electrochemical lithium accumulator with a so-called specific bipolar architecture comprising a specific electrolyte additive intended to facilitate operations for charging this accumulator.

The field of the invention may thus be defined as that of energy storage devices, in particular that of electrochemical accumulators.

STATE OF THE PRIOR ART

Energy storage devices are conventionally electrochemical accumulators operating on the principle of electrochemical cells capable of delivering an electric current by the presence in each of them of a pair of electrodes (an anode and a cathode, respectively) separated by an electrolyte. The electrodes comprising specific materials capable of reacting according to an oxidation-reduction reaction, for which there is production of electrons at the origin of the electric current and production of ions which will circulate from one electrode to the other via an electrolyte.

Accumulators subscribing to this principle, the most used presently, are the following:

Ni-MH accumulators using metal hydride and nickel oxyhydroxide as electrode materials;

Ni—Cd accumulators using cadmium and nickel oxyhydroxide as electrode materials;

lead-acid accumulators using lead and lead oxide $PbO_2$ as electrode materials;

Li-ion accumulators conventionally using totally or partly lithiated materials as electrode materials.

Over the past few years, Li-ion accumulators have widely supplanted the other accumulators mentioned above because of the continuous improvement in the performances of Li-ion accumulators in terms of energy density. Indeed, lithium ion accumulators give the possibility of obtaining mass and volume energy densities (which may be greater than 180 Wh·$kg^{-1}$) significantly greater than those of Ni-MH and Ni—Cd accumulators (which may range from 50 to 100 Wh·$kg^{-1}$) and lead-acid accumulators (which may range from 30 to 35 Wh·$kg^{-1}$). Furthermore, Li-ion accumulators may have a rated cell voltage above that of the other accumulators (for example, a rated voltage of the order of 3.6V for a cell applying as electrode materials the $LiCoO_2$/graphite pair versus a rated voltage of the order of 1.5V for the other aforementioned accumulators).

Because of their intrinsic properties, Li-ion accumulators therefore prove to be of particular interest for the fields where self-containment is a primordial criterion, such as this is the case for the fields of computer, video, telephone technology, transportation such as electric vehicles, hybrid vehicles or further the medical, space, microelectronics fields.

From a functional point of view, lithium-ion accumulators operate on the principle of intercalation-deintercalation of lithium within the constitutive electrodes of the electrochemical cells of the accumulator.

More specifically, the reaction at the origin of the production of current (i.e. when the accumulator is in a discharge mode) sets into play the transfer, via an electrolyte conducting lithium ions, of lithium cations from a negative electrode which will be intercalated into the acceptor lattice of the positive electrode, while electrons from the reaction at the negative electrodes will supply the outer circuit to which are connected the positive and negative electrodes.

The first lithium accumulators included lithium metal at their negative electrodes, which provided a high rated cell voltage and excellent mass and volume energy densities. However, it was found that repeated recharging of this type of accumulator may be accompanied by the formation of lithium dendrites which may be at the origin of the degradation of the constitutive elements of the electrochemical cells, such as separators comprising the electrolyte.

In order to circumvent instability, safety and lifetime problems inherent to lithium metal used for forming negative electrodes, research work was reoriented in order to set into place generators based on non-metal lithium. To do this, accumulators were proposed, comprising an electrochemical cell including the following pair of electrodes:

a negative electrode based on a carbonaceous material, such as graphite;

a positive electrode based on a lithiated transition metal oxide of the $LiMO_2$ type, wherein M designates Co, Ni, Mn.

However, because of the use of graphite for forming the negative electrode, such accumulators do not have optimum power behavior.

In order to overcome this drawback, it was proposed to replace graphite with a lithiated material, in particular with lithiated titanium oxide $Li_4Ti_5O_{12}$. This however causes a decrease in the rated cell voltage (the latter passing from 3.6V to 2.5V), therefore causing a decrease in the energy density of the single-cell accumulator.

In order to produce an accumulator with this type of negative electrode material while retaining an energy density comparable with that of accumulators using graphite, the idea is to produce an accumulator comprising a plurality of electrochemical cells mounted in series, in order to increase the overall voltage of the accumulator, while trying to limit the mass and the volume of the latter.

A suitable architecture for putting electrochemical cells in series, without interfering with the mass and the volume of the resulting accumulator, is the so-called <<bipolar>> architecture, consisting of stacking several electrochemical cells separated from each other by a current-collecting substrate, one face of this substrate being occupied by an electrode of a cell while the opposite face of this substrate is occupied by an electrode of opposite sign of an adjacent cell. This type of architecture allows reduction in the electrical resistance of the assembly as compared with one accumulator, which would consist of a plurality of cells connected together through external connectors.

This bipolar architecture also allows limitation of the unnecessary masses and volumes.

However, this type of architecture may have drawbacks in terms of charging, since the electrochemical cells because of their positioning in the stack, have different characteristics in terms of internal resistance and of capacitance, which causes different charging times for identical electrochemical materials.

Conventionally, the charging operations may be carried out according to one of the following charging methods:
- either charging is maintained, until one of the constitutive electrochemical cells of the stack is completely charged, the other cells may thus be found partly charged, the final potential of the stack being thus less as compared with the case when all the cells would be completely charged;
- or charging is maintained until the whole of the electrochemical cells is completely charged, the cells which are charged more rapidly than the others may be thus found in an overcharged condition, i.e. their potential may attain values which may cause degradation of the electrolyte or of the electrode materials.

None of these charging methods prove to be satisfactory for the reasons mentioned above.

In order to overcome these drawbacks, certain authors (notably in WO 2008/53365) have proposed to provide the accumulators with electronic control systems giving the possibility of monitoring the charge condition of the constitutive cells of the accumulator, so as to be able to control the stopping of the charging of the latter as soon as they are completely charged. However, the use of such a system causes bulkiness of the accumulator, thereby being detrimental to the compactness of the latter.

The authors of the present invention therefore propose to set into place a novel system for controlling the charging of electrochemical cells of a lithium accumulator with bipolar architecture, this system not being detrimental to the compactness of the system and being efficient notably for electrochemical cells not using graphite as an electrode material.

DISCUSSION OF THE INVENTION

The authors of the present invention have surprisingly discovered that by adding a specific additive into the electrolyte of the electrochemical cells of a lithium accumulator with bipolar architecture, it is possible to find a remedy to the charging problems of said cells.

Thus, the invention relates to an electrochemical lithium accumulator comprising at least one first electrochemical cell and at least one second electrochemical cell separated from each other by a current-collecting substrate, which substrate supports on a first face, an electrode of said first electrochemical cell and on a second face opposite to said first face, an electrode of said second electrochemical cell, each cell comprising a positive electrode and a negative electrode separated by an electrolyte, characterized in that the electrolyte comprises a lithium polysulfide additive.

Before entering the discussion of this invention in more detail, we specify the following definitions.

By positive electrode is conventionally meant, in the foregoing and in the following, the electrode which acts as a cathode, when the generator outputs current (i.e. when it is in a discharge process) and which acts as an anode when the generator is in a charging process.

By negative electrode is conventionally meant, in the foregoing and in the following, the electrode which acts as an anode, when the generator outputs current (i.e. when it is in a discharge process) and which acts as a cathode, when the generator is in a charging process.

The lithium polysulfide additive added into the electrolyte, ensures the role of a redox shuttle, which means, in other words, that this additive will undergo, at a determined potential, an oxidation at one of the electrodes of the cell in order to give an oxidized form of the additive, this oxidized form in turn undergoing reduction at the electrode of opposite sign of the same cell in order to give a reduced form, this reduced form then being capable of being oxidized at the electrode with reverse polarity. At the aforementioned determined potential, an equilibrium is set into place, causing consumption of the additive at an electrode and its regeneration at the electrode of opposite sign (whence the name of redox shuttle). These reactions occurring at a constant potential, this consumption/regeneration phenomenon of the additive causes stabilization of the cell voltage, as soon as this mechanism is set into place.

In the case of lithium polysulfide additives, this redox shuttle mechanism occurs at a potential located between 2.4 and 2.5V relatively to the reference pair $Li^+/Li$, which means that this additive is particularly suitable for electrochemical cells for which the rated cell voltage after complete charging is less than all the voltage values taken in the aforementioned range (i.e. between 2.4 and 2.5V) and for which the overcharge voltage of these cells is greater than all the values taken in the aforementioned range.

Advantageously, the potential at which the redox shuttle mechanism of the additive is set into place, is located at a value being at 0.2 to 0.3V above the rated cell voltage after complete charging.

Thus, with such cells, the cell voltage, by the use of an additive of the lithium polysulfide, is stabilized at a value below a voltage value, for which said cell is in an overcharged condition, and this regardless of the charging time, which means that during charging operations, there is no longer any risk that the cells be in an overcharged condition and, consequently in a degradation condition of the electrolyte due to this overcharging.

Consequently, due to the stabilization of the cell voltage by the addition of the aforementioned additive, the charging of the cells, the rated voltage of which is not attained, may be maintained, without this affecting the cells for which charging is completed. The result at the end of the charging, is thus an accumulator for which each of the cells has the same charged condition at the end of the cycle and for which the overall voltage is thus perfectly defined.

In other words, the use of an additive of the lithium polysulfide type according to the invention consists of proposing a solution for balancing the different constitutive cells of an electrochemical accumulator with a bipolar architecture, upon applying charging processes. This additive is thus used in order to have the already charged cells <<wait>>, while the other cells continue their charging process. Indeed, by the shuttle mechanism, which is set into place between the electrodes, the potential is stabilized at the end of the charging for the charged cells, instead of rapidly increasing and leading to an overcharging phenomenon. The other cells may then continue their charging during this time. Thus, the subsequent charging cycles may be carried out for a quasi-infinite time, without their being any fear of degradation of the components of the accumulator. The cells may then be completely charged, even if they are intrinsically different.

Therefore there is no longer any need of using electronic systems for controlling the charging of different constitutive cells of the accumulator, the protection against overcharging phenomena being intrinsic to the structure of the cells and not to external systems. The result of this, as compared with accumulators using control systems, is making the accumulators more lightweight and furthermore is the disappearance of the failure concerns regarding the control system which may occur.

Finally, the use of an additive of the lithium polysulfide type may also be efficient, when, at least one of the electrochemical cells of the accumulator is characterized by a failure which is materialized by an increase in the cell voltage without any actual recharging of the electrodes, which would be detrimental to the surrounding cells. With the additives according to the invention, the cell voltage of faulty cells is stabilized to a value conventionally ranging from 2.4 to 2.5V (which corresponds to the potential, at which is set into place the redox shuttle mechanism of the additive), the other non-faulty cells may continue to be charged.

As mentioned above, the additive used according to the invention is a lithium polysulfide. The latter may notably fit the formula $Li_2S_n$ with n being an integer ranging from 2 to 8, such as $Li_2S_6$, $Li_2S_8$. The additive concentration in the electrolyte may range from 0.01 to 1 mol·$L^{-1}$ and, preferably, may be equal to 0.1 mol·$L^{-1}$.

As already described above, these additives are capable of undergoing reversible oxidation-reduction reactions on the potential value which may range from 2.4 to 2.5V and contribute to the stabilization of the rated cell voltage after complete charging in which they are included at a value comprised in the range from 2.4 to 2.5V. The use of these additives is thus particularly advantageous for accumulators, for which the rated voltage of each chemical cell after complete charging is less than all voltage values taken in the aforementioned range (i.e. between 2.4 and 2.5V) and for which the overcharging voltage of these cells is greater than all values taken in the aforementioned range.

Accumulators fitting these aforementioned specificities may be accumulators comprising cells selected from the following cells:
  cells for which:
  the positive electrode comprises a material selected from:
    phosphate oxides of formula $LiM_y(XO_z)_n$ with M representing an element selected from Mn, Fe, Co, Ni, Cu, Mg, Zn, V, Ca, Sr, Ba, Ti, Al, Si, B, Mo and mixtures thereof, X represents an element selected from P, Si, Ge, S and As; y, z and n represent positive integers selected so that the total charge of the cations compensates for the total charge of the anions, so that the compound is electrically neutral;
    oxides of formula $LiZO_2$ with Z representing an element selected from Ni, Co, Cr, Mn, Al and mixtures thereof; and
  the negative electrode comprises a material selected from lithium and titanium mixed oxides, $Li_3V_2(PO_4)_3$;
  cells for which:
  the positive electrode comprises an oxide of formula $Li_3V_2(PO_4)_3$; and
  the negative electrode comprises a material comprising titanium dioxide; and
  cells for which:
  the positive electrode comprises a material selected from lithiated oxides comprising manganese with a spinel structure, such as $LiNi_{0.5}Mn_{1.5}O_4$;
  the negative electrode comprises a material comprising $LiTi_2(PO_4)_3$.

As an example of such cells, mention may be made of those for which the positive electrode comprises $LiFePO_4$ and the negative electrode comprises $Li_4Ti_5O_{12}$ or $Li_3V_2(PO_4)_3$.

Advantageously, an accumulator according to the invention is an accumulator comprising at least two electrochemical cells for which, for each cell, the positive electrode comprises $LiFePO_4$ and the negative electrode comprises $Li_4Ti_5O_{12}$.

The aforementioned current-collecting substrate is advantageously in aluminium or an aluminium alloy.

The electrolyte is preferably a liquid electrolyte comprising a lithium salt.

Thus, for example, the electrolyte may comprise one or more solvents from the family of carbonates, such as ethylene carbonate, propylene carbonate, dimethyl carbonate and one or more lithium salts, such as $LiPF_6$, $LiClO_4$, $LiBF_4$, $LiAsF_6$, $LiCF_3SO_3$, $LiN(CF_3SO_2)_3$, $LiN(C_2F_5SO_2)$ and mixtures thereof.

The use of a liquid electrolyte advantageously gives the possibility of ensuring good diffusion of the lithium polysulfide additives from one electrode to the other and thus efficient protection against the overcharging of a cell, even in the case of high charging rates.

The aforementioned liquid electrolytes may, in the electrochemical cells of the accumulators of the invention, be caused to impregnate a separator, which is positioned between the positive electrode and the negative electrodes of the electrochemical cell.

This separator may be in a porous material, such as a polymeric material, capable of receiving the liquid electrolyte in its porosity.

A specific accumulator according to the invention is an accumulator for which:
  for each cell, the positive electrode comprises $LiFePO_4$, the negative electrode comprises $Li_4Ti_5O_{12}$, the electrolyte is a liquid electrolyte comprising one or more solvents from the family of carbonates and a lithium salt $LiPF_6$ and the polysulfide additive is $Li_2S_6$;
  the current-collecting substrate separating a cell from its adjacent cell is in aluminium or an aluminium alloy.

The solvents of the family of carbonates may for example be a mixture of ethylene carbonate, propylene carbonate and dimethyl carbonate.

When the first cell and/or the second cell is located at the end of the accumulator (i.e. it forms the cell located at the end of the stack), this first and/or second cell contains, in addition to an electrode deposited on one face of a current-collecting substrate, the opposite face of which is occupied by an electrode of opposite sign of the adjacent cell, an electrode of opposite sign deposited on a first face of a current-collecting substrate, the face opposite to said first face not being occupied by an electrode of an adjacent cell, considering that said first cell and/or the second cell forms the last cell of the stack. The current-collecting substrate, one single face of which is occupied by an electrode, may also be advantageously in aluminium or an aluminium alloy.

The accumulators according to the invention are particularly suitable for products requiring compact integration architectures (such as in onboard systems, self-contained systems), where significant energy is required. This type of requirements may be encountered in the fields of products requiring a self-contained power supply, which is the case of the fields of computer, video, telephone technology, transportation such as electric vehicles, hybrid vehicles, or further medical, space, microelectronics fields.

The invention will now be described with reference to the particular embodiment defined below with reference to the appended figures.

SHORT DESCRIPTION OF THE DRAWINGS

for an electrochemical cell of an accumulator on the basis of a pair of LiFePO$_4$/Li$_4$Ti$_5$O$_{12}$ electrodes and of an electrolyte without any lithium polysulfide additive.

Figure 3:
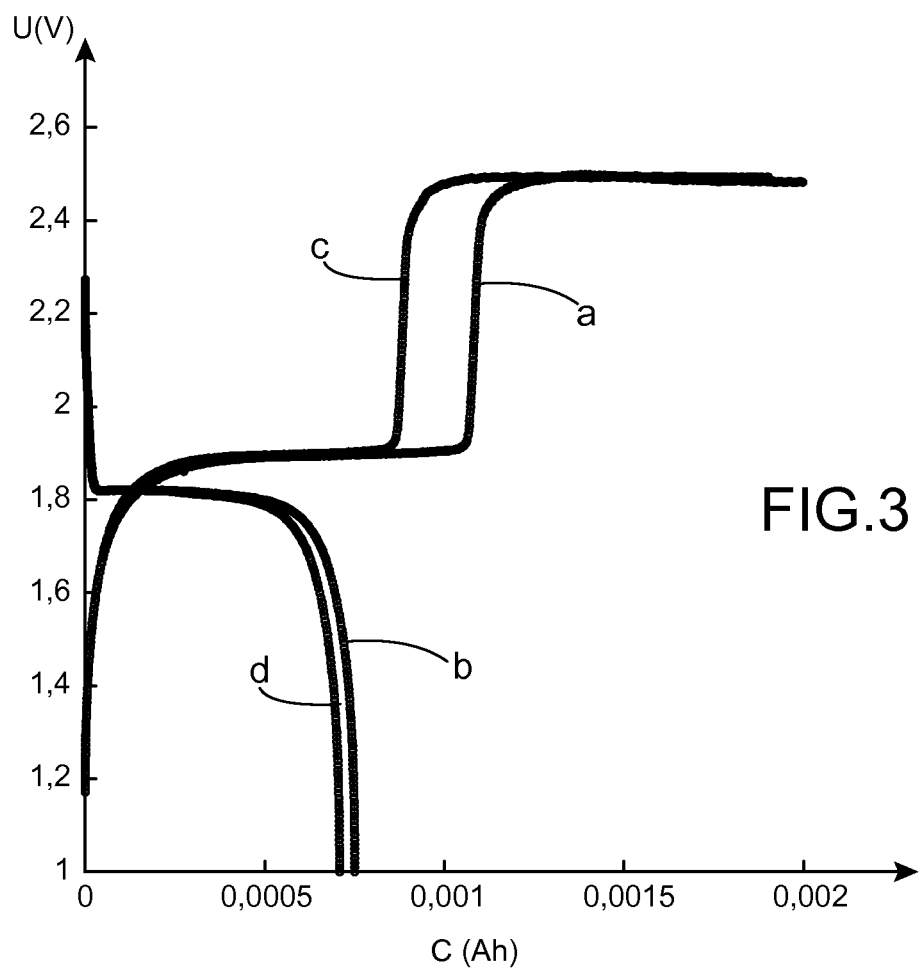

FIG. 3 illustrates a graph illustrating the change in the cell voltage U (in V), as a function of the capacity C (in Ah) at the terminals of an electrochemical cell based on a pair of LiFePO$_4$/Li$_4$Ti$_5$O$_{12}$ electrodes and on an electrolyte comprising a lithium polysulfite additive of formula Li$_2$S$_6$ for two charging/discharging cycles (curves a and b for the first cycle and curve c and d for the second cycle).

DETAILED DISCUSSION OF PARTICULAR EMBODIMENTS

The example shown below illustrates the preparation of an accumulator according to the invention illustrated in the appended FIG. 1, this accumulator consisting of a stack of a first electrochemical cell and of a second electrochemical cell separated by a current-collecting substrate in aluminium, said to be <<bipolar>>, each cell respectively comprising a positive electrode comprising LiFePO$_4$ and a negative electrode comprising Li$_4$Ti$_5$O$_{12}$ separated by an electrolyte comprising a lithium polysulfide additive Li$_2$S$_6$.

1) Making the Positive Electrode a so-Called <<Peripheral Positive Electrode>>

A positive electrode of the following composition:
80% by mass of LiFePO$_4$;
10% by mass of super P carbon black;
10% by mass of polyvinylidene fluoride (PVDF) is prepared according to the following procedure:
weighing LiFePO$_4$ and carbon black powders separately;
preparing a solution of N-methyl-pyrrolidone (NMP) comprising the PVDF;
gradually adding into said solution the aforementioned powders while proceeding with mixing by mechanical stirring;
after obtaining a homogeneous mixture, coating by means of a micrometric doctor blade one face of an aluminium sheet with a thickness of 20 μm, with said mixture in order to obtain a layer having a thickness of 200 μm;
drying the thereby deposited layer in an oven at 55° C. for 24 hours, so as to obtain evaporation of NMP, in return for which the resulting layer forms the positive electrode.

2) Making the Negative Electrode a so-Called <<Peripheral Negative Electrode>>.

A negative electrode of the following composition:
80% by mass of Li$_4$Ti$_5$O$_{12}$;
10% by mass of super P carbon black;
10% by mass of polyvinylidene fluoride (PVDF) is prepared according to the following procedure:
weighing the Li$_4$Ti$_5$O$_{12}$ and carbon black powders separately;
preparing a solution of N-methyl-pyrrolidone (NMP) comprising the PVDF;
gradually adding into said solution the aforementioned powders while proceeding with mixing by mechanical stirring;
after obtaining a homogeneous mixture, coating by means of a micrometric doctor blade one face of an aluminium sheet with a thickness of 20 μm with said mixture so as to obtain a layer having a thickness of 200 μm;
drying the thereby deposited layer in an oven at 55° C. for 24 hours, so as to obtain evaporation of NMP, in return for which the resulting layer forms the positive electrode.

3) Making the Substrate a so-Called <<Bipolar Substrate>>

The bipolar substrate is made by applying the operating procedure discussed in paragraph 1) above, on a first face of an aluminium sheet with a thickness of 20 μm and the operating procedure discussed in paragraph 2) above, on a second face of the same sheet, this second face being opposite to said first face.

4) Making the Stack

After cutting them out to the selected format, the electrodes prepared according to the procedures discussed in paragraphs 1) and 2) and the bipolar substrate prepared according to the procedure discussed in paragraph 3) are compressed with 2 t/cm$^2$ at room temperature separately.

Figure 1:
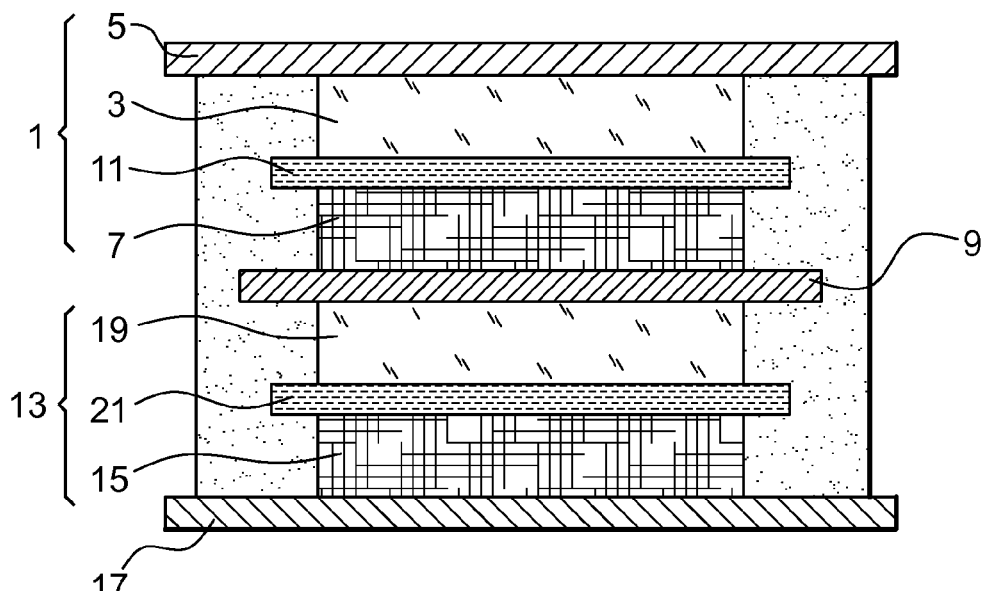
FIG. 1 illustrates an accumulator according to the invention according to a particular embodiment.

The accumulator illustrated in FIG. 1 is made in two steps.

A first step, carried out under a non-controlled atmosphere, consists of placing, according to a configuration compliant with the one illustrated in FIG. 1, the peripheral positive electrode, the bipolar substrate and the peripheral negative electrode in two U-shaped polyethylene gaskets, leaving one face of the generator open, followed by a hot compression step for the assembly so as to ensure the seal of the accumulator.

A second step, carried out in an inert atmosphere, consists of introducing through the open face, in both cells between the positive electrode and the negative electrode, a polypropylene/polyethylene separator impregnated with a liquid electrolyte based on LiPF$_6$ (1 mol·L$^{-1}$) in solution in a mixture of ethylene carbonate, propylene carbonate and dimethyl carbonate in respective volume proportions of 1:1:3. To this electrolyte, is added Li$_2$S$_6$ so as to obtain a concentration of this additive of 0.1 mol·L$^{-1}$.

The additive Li$_2$S$_6$ may be prepared beforehand by reaction of lithium in metal form and of elemental sulfur in stoichiometric proportions in tetraethylene glycol dimethylether.

The open face is then closed by means of the two other gaskets in polyethylene.

At the end of these different steps, an electrochemical lithium accumulator is obtained, according to what is illustrated in FIG. 1, comprising:
a first electrochemical cell 1 comprising a peripheral positive electrode 3 comprising LiFePO$_4$ deposited on a conducting aluminium substrate 5 and, facing it, a negative electrode 7 comprising Li$_5$O$_{12}$ deposited on a first face of a conducting aluminium substrate 9, said negative electrode and said positive electrode being separated from each other by a separator 11 impregnated with an electrolyte as defined above; and
a second electrochemical cell 13 comprising a peripheral negative electrode 15 comprising Li$_4$Ti$_5$O$_{12}$ deposited on a conducting aluminium substrate 17 and, facing it, a positive electrode 19 comprising LiFePO$_4$ deposited on a second face of said conducting aluminium substrate 9, said second face being opposite to said first face, said negative electrode and said positive electrode being separated from each other by a separator 21 impregnated with an electrolyte as defined above.

In order to demonstrate the benefit of the use of Li$_2$S$_6$ in the electrolyte, different tests were conducted.

According to a first test, a C/10 charging operation was carried out at 20° C. of an accumulator compliant with what is described above, with the only difference is that the electrolyte is without any Li$_2$S$_6$.

Figure 2:
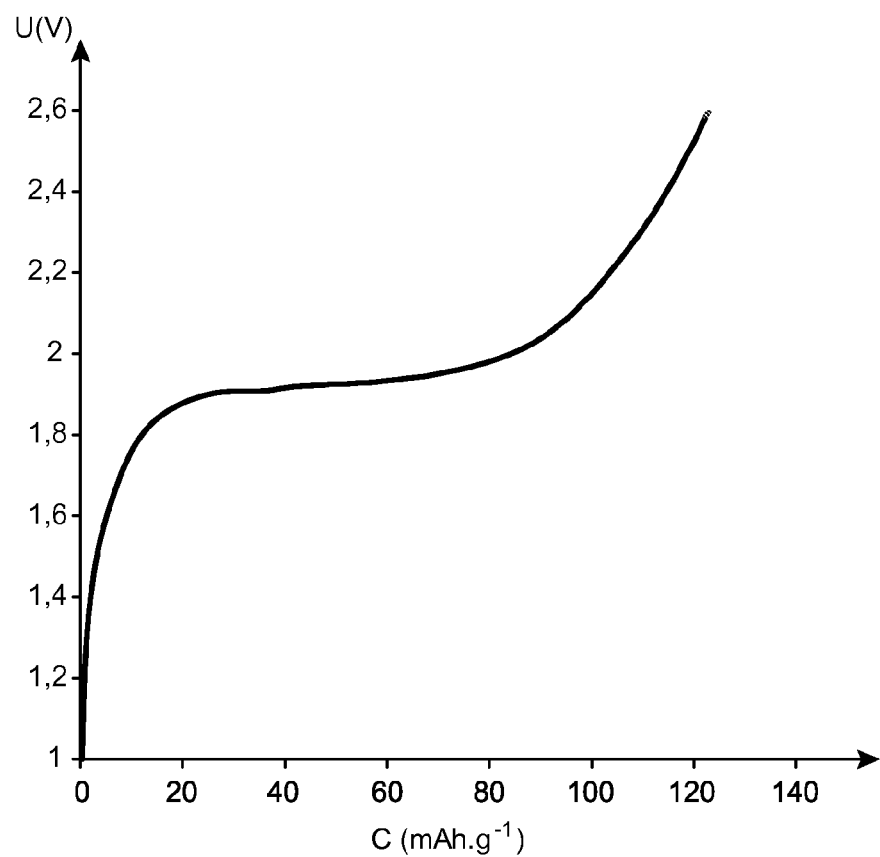
FIG. 2 illustrates a graph illustrating the change in the cell voltage U (in V) as a function of the capacity C (in mAh·$g^{-1}$)

The charging curve illustrating the change in the cell voltage U (in V) versus the capacity C (in mAh·g$^{-1}$) is illustrated in FIG. 2.

The curve has an ascending phase between 1V and 1.8V and then a plateau shape between 1.8 and 2V, ending with an exponential ascending phase from 2.2V (rated cell voltage after complete charge of the latter) up to 2.6V.

If the charging is continued, the cells are found in an overcharged state, which may cause after a certain number of charging cycles a degradation of the electrolyte.

According to a second test, successive charging/discharging operations were carried out (curves a and b for the first operation respectively and curves c and d for the second operation respectively) at C/100 at 20° C. for cycling ranging from 1 to 2.6V with an accumulator identical with the one used for the first test, if only that the electrolyte in this case comprises $Li_2S_6$ at a concentration of 0.1 mol·L$^{-1}$.

The charging/discharging curves illustrating the change in the cell voltage U (in V) versus the capacity C (in Ah) are illustrated in FIG. 3.

The charging curves (a and c) have an ascending phase between 1V and 1.8V, then adopt a plateau shape between 1.8 and 2 and then have a new ascending phase between 2 and 2.45, the potential stabilizing around 2.45V.

Thus, the end of charging, the potential is stabilized around 2.45V instead of increasing exponentially. Charging may thus be continued indefinitely on such an electrochemical cell, without their being any undesirable voltage peak, which thus avoids any risk of degradation of the electrolyte. Charging may notably be maintained so as to attain the end of the charging of the other cells of the accumulator, which would not be completely charged.

This value of 2.45V corresponds to the potential at which an equilibrium is established between the consumption of the $Li_2S_6$ additive at one of the electrodes and regeneration of the consumed additive at the electrode of opposite sign. This potential is located above the rated cell voltage after complete charging of the latter (which allows the electrochemical cell to be completely charged) and also gives the possibility of avoiding that the cell be subject to too large voltages if the charging has to be maintained in order to allow the other incompletely charged cells to continue to be subject to this charging process.

The discharge curves (curves b and d respectively) are superposed which means in other words that the discharging capacity is retained from one operation to the other, which expresses the absence of degradation of the performances of the accumulator from one operation to the next.

The invention claimed is:

1. An electrochemical lithium accumulator comprising a bipolar architecture comprising at least one first electrochemical cell and at least one second electrochemical cell separated from each other by a current-collecting substrate, which current-collecting substrate supports on a first face an electrode of said first electrochemical cell and on a second face opposite to said first face, an electrode of said second electrochemical cell, each electrochemical cell comprising a positive electrode and a negative electrode separated by an electrolyte,
wherein the electrolyte is a liquid electrolyte comprising a lithium salt and a lithium polysulfide additive;
the positive electrode comprises a material selected from:
phosphate oxides of formula $LiM_y(XO_z)_n$ with M representing an element selected from Mn, Fe, Co, Ni, Cu, Mg, Zn, V, Ca, Sr, Ba, Ti, Al, Si, B, Mo and mixtures thereof, X representing an element selected from P, Si, Ge, S and As; and y, z and n representing positive integers selected so that the total charge of the cations compensates for the total charge of the anions, so that the compound is electrically neutral; and
oxides of formula $LiZO_2$ with Z representing an element selected from Ni, Co, Cr, Mn, Al and mixtures thereof; and
the negative electrode comprises a material selected from lithium and titanium mixed oxides, and $Li_3V_2(PO_4)_3$.

2. The accumulator according to claim 1, wherein the lithium polysulfide additive fits the formula $Li_2S_n$ with n being an integer ranging from 2 to 8.

3. The accumulator according to claim 1, wherein the positive electrode comprises $LiFePO_4$ and the negative electrode comprises $Li_4Ti_5O_{12}$ or $Li_3V_2(PO_4)_3$.

4. The accumulator according to claim 1, wherein the positive electrode comprises $LiFePO_4$ and the negative electrode comprises $Li_4Ti_5O_{12}$.

5. The accumulator according to claim 1, wherein:
the positive electrode comprises $Li_3V_2(PO_4)_3$ and
the negative electrode comprises a material comprising titanium dioxide.

6. The accumulator according to claim 1, wherein:
the positive electrode comprises a material selected from lithiated oxides comprising manganese with a spinel structure; and
the negative electrode comprises a material comprising $LiTi_2(PO_4)_3$.

7. The accumulator according to claim 1, wherein the current-collecting substrate is in aluminium or aluminium alloy.

8. The accumulator according to claim 1, wherein the lithium salt is selected from $LiPF_6$, $LiClO_4$, $LiBF_4$, $LiAsF_6$, $LiCF_3SO_3$, $LiN(CF_3SO_2)_3$, $LiN(C_2F_5SO_2)$ and mixtures thereof.

9. The accumulator according to claim 1, wherein the electrolyte further comprises one or more solvents from the family of carbonates.

10. The accumulator according to claim 1, wherein:
for each cell, the positive electrode comprises $LiFePO_4$, the negative electrode comprises $Li_4Ti_5O_{12}$, the electrolyte is a liquid electrolyte comprising one or more solvents from the family of carbonates and a lithium salt $LiPF_6$ and the polysulfide additive is $Li_2S_6$; and
the current-collecting substrate separating a cell from its adjacent cell is in aluminium or an aluminium alloy.

11. The accumulator according to claim 1, wherein the lithium polysulfide additive comprises $Li_2S_6$.

12. The accumulator according to claim 6, wherein the positive electrode comprises $LiNi_{0.5}Mn_{1.5}O_4$.

13. The accumulator according to claim 1, wherein the liquid electrolyte is impregnated in a separator positioned between the positive electrode and the negative electrode of the electrochemical cell.

14. The accumulator according to claim 9, wherein the carbonate is one or more of ethylene carbonate, propylene carbonate or dimethyl carbonate.

15. The accumulator according to claim 8, wherein the electrolyte comprises one or more solvents from the family of carbonates.

16. The accumulator according to claim 15, wherein the carbonate is one or more of ethylene carbonate, propylene carbonate or dimethyl carbonate.

* * * * *